(12) United States Patent
Chopko et al.

(10) Patent No.: US 11,497,224 B2
(45) Date of Patent: Nov. 15, 2022

(54) PREP IN TRANSIT MANAGEMENT SYSTEM FOR PERISHABLE GOOD TRANSPORT

(71) Applicant: CARRIER CORPORATION, Palm Beach Gardens, FL (US)

(72) Inventors: Robert A. Chopko, Baldwinsville, NY (US); Marc Beasley, Beverly, MA (US); Ciara Poolman, Syracuse, NY (US); John Cronin, Bonita Springs, FL (US); Christopher Michael Huffines, Burlington, VT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 948 days.

(21) Appl. No.: 16/319,614

(22) PCT Filed: Jul. 20, 2017

(86) PCT No.: PCT/US2017/043063
§ 371 (c)(1),
(2) Date: Jan. 22, 2019

(87) PCT Pub. No.: WO2018/017829
PCT Pub. Date: Jan. 25, 2018

(65) Prior Publication Data
US 2021/0282419 A1    Sep. 16, 2021

Related U.S. Application Data

(60) Provisional application No. 62/365,749, filed on Jul. 22, 2016.

(51) Int. Cl.
*A23B 7/148* (2006.01)
*F25D 11/00* (2006.01)
(Continued)

(52) U.S. Cl.
CPC ............ *A23B 7/148* (2013.01); *F25D 11/003* (2013.01); *G06Q 10/0832* (2013.01);
(Continued)

(58) Field of Classification Search
CPC ............... F25D 11/003; F25D 2500/06; G06Q 10/0832
See application file for complete search history.

(56) References Cited

U.S. PATENT DOCUMENTS 5,799,495 A    9/1998 Gast, Jr. et al.
5,965,185 A *  10/1999 Bianco ................... A23B 7/148
                                              62/239

(Continued)

FOREIGN PATENT DOCUMENTS

WO    2014100249 A2    6/2014

OTHER PUBLICATIONS

International Search Report for International Application No. PCT/US2017/043063; Date of Completion: Aug. 31, 2017; dated Sep. 7, 2017; 5 Pages.

(Continued)

*Primary Examiner* — Joseph F Trpisovsky
(74) *Attorney, Agent, or Firm* — Cantor Colburn LLP (57) ABSTRACT

A system for managing ripeness of perishable goods including: a storage device to store perishable good requirements, ripening capability parameters, ripening schedules, and perishable good parameters associated with the perishable goods; and a ripeness management system coupled to the storage device. The ripeness management system including: a current ripeness determination module to determine current ripeness levels in response to at least one of the perishable good parameters, the perishable good requirements, and the ripening schedules; a ripeness schedule module to determine predicted ripeness levels in response to at least one of the current ripeness levels, the ripening (Continued)

capability parameters, and the ripening schedules; and a meshing module to determine ripening schedule adjustments in response to at least one of the current ripeness levels, the perishable good parameters, the ripening schedules, and the ripening capability parameters.

17 Claims, 3 Drawing Sheets

(51) Int. Cl.
    *G06Q 10/08*      (2012.01)
    *G06Q 50/28*      (2012.01)
    *G06Q 50/30*      (2012.01)
    *G01N 21/84*      (2006.01)
    *G06Q 50/02*      (2012.01)

(52) U.S. Cl.
    CPC ............. *G06Q 50/28* (2013.01); *G06Q 50/30* (2013.01); *F25D 2500/06* (2013.01); *G01N 2021/8466* (2013.01); *G06Q 50/02* (2013.01)

(56) References Cited

U.S. PATENT DOCUMENTS

| | | | |
|---|---|---|---|
| 6,202,434 B1* | 3/2001 | Hearne, Jr. | A23B 4/068 |
| | | | 62/304 |
| 6,256,905 B1 | 7/2001 | White | |
| 6,471,136 B1 | 10/2002 | Chatterjee et al. | |
| 7,455,225 B1 | 11/2008 | Hadfield et al. | |
| 2007/0040647 A1 | 2/2007 | Saenz et al. | |
| 2014/0041532 A1 | 2/2014 | Minvielle | |
| 2014/0072682 A1* | 3/2014 | Jeong | A23B 7/152 |
| | | | 99/476 |

OTHER PUBLICATIONS

Janssen et al. "Ethylene detection in fruit supply chains", Philosophical Transactions of the Royal Society, Jun. 13, 2014, vol. 372, 21 Pages.

Jedermann et al. "Remote quality monitoring in the banana chain", Philosophical Transactions of the Royal Society, Jun. 13, 2014, vol. 372, 21 Pages.

Lang et al. "The Intelligent Container: A Cognitive Sensor Net for Fruit Logistics", Sensornets, International Conference on Sensor Networks, 2014, pp. 351-359.

Maitri Thakur et al.; Integrated Online Temperature Monitoring and Traceability in a Cold Meat Chain Using Epcis Deparlment of Aquaculture Technology, Sintef Fisheries and Aquaculture, Trondheim, Norway; http://www.tracefood.org/images/4/41/ColdChainRFID_Paper_IWAMA.pdf; Sep. 2, 2013; 8 pages.

Nechifor et al. "Autonomic monitoring approach based on CEP and ML for logistic of sensitive goods", IEEE 18th International Conference on Intelligent Engineering Systems INES 2014, Jul. 3-5, 2014, Abstract Only, 1 Page.

Pang et al. "Global fresh food tracking service enabled by wide area wireless sensor network", 2010 IEEE Sensors Applications Symposium (SAS), Feb. 23-25, 2010, Abstract Only, 1 Page.

Produce Shelf Life: Issues and Extension Methods from Harvest to Retailer. DeltaTrak. Retrieved Jan. 21, 2019 from https://www.deltatrak.com/resources/white-papers/produce-shelf-life-issues-and-extension-methods-from-harvest-to-retailer. 8 Pages.

Purfresh; http://www.purfresh.com/library/brochures/transport/BR-PTR-2012-06.pdf; Jun. 7, 2012; 2 pages.

Thornhill et al. "PLC control of a cold store and ripening plant—a case history", Advances in Software Engineering for PLC, Oct. 14, 1993, Abstract Only, 1 Page.

Written Opinion for International Application No. PCT/US2017/043063; International Filing Date: Jul. 20, 2017; dated Sep. 7, 2017; 6 Pages.

* cited by examiner

FIG. 3

PREP IN TRANSIT MANAGEMENT SYSTEM FOR PERISHABLE GOOD TRANSPORT

CROSS-REFERENCE TO RELATED APPLICATIONS

This application is based on International Application No. PCT/US2017/043063 filed Jul. 20, 2017, which claims priority to U.S. Provisional Patent Application Ser. No. 62/365,749 filed Jul. 22, 2016, both of which are incorporated herein by reference in its entirety.

BACKGROUND OF THE DISCLOSURE

The embodiments disclosed herein generally relate to cold chain distribution systems, and more specifically to an apparatus and a method for managing ripeness of perishable goods.

Typically, cold chain distribution systems are used to transport and distribute perishable goods and environmentally sensitive goods (herein referred to as perishable goods) that may be susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated trucks and trailers are commonly used to transport perishable goods in a cold chain distribution system. A transport refrigeration system is mounted to the truck or to the trailer in operative association with a cargo space defined within the truck or trailer for maintaining a controlled temperature environment within the cargo space.

Conventionally, transport refrigeration systems used in connection with refrigerated trucks and refrigerated trailers include a transport refrigeration unit having a refrigerant compressor, a condenser with one or more associated condenser fans, an expansion device, and an evaporator with one or more associated evaporator fans, which are connected via appropriate refrigerant lines in a closed refrigerant flow circuit. Air or an air/gas mixture is drawn from the interior volume of the cargo space by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo space.

Consumers are becoming increasingly concerned with the quality of the perishable goods they are purchasing and many factors must be controlled when attempting to maintain a high quality perishable good. Commonly consumers desire the perishable good to be at peak ripeness at the time of purchase. It is often difficult to attain peak ripeness at time of purchase as the perishable goods may change hands several times along the route. Improved systems, particularly improved systems for ripeness management would provide benefits to the industry.

BRIEF DESCRIPTION OF THE DISCLOSURE

According to one embodiment, a system for managing ripeness of perishable goods is provided. The system including: a storage device to store perishable good requirements, ripening capability parameters, ripening schedules, and perishable good parameters associated with the perishable goods; and a ripeness management system coupled to the storage device. The ripeness management system including: a current ripeness determination module to determine current ripeness levels in response to at least one of the perishable good parameters, the perishable good requirements, and the ripening schedules; a ripeness schedule module to determine predicted ripeness levels in response to at least one of the current ripeness levels, the ripening capability parameters, and the ripening schedules; and a meshing module to determine ripening schedule adjustments in response to at least one of the current ripeness levels, the perishable good parameters, the ripening schedules, and the ripening capability parameters.

In addition to one or more of the features described above, or as an alternative, further embodiments of the system may include a transport refrigeration system in operative communication with the storage device and the ripeness management system through a network, and the transport refrigeration system operates in accordance with the ripening schedules.

In addition to one or more of the features described above, or as an alternative, further embodiments of the system may include that the operation of the transport refrigeration system is adjusted in response to at least one of the ripening schedule adjustments and manual ripening schedule adjustments.

In addition to one or more of the features described above, or as an alternative, further embodiments of the system may include that the ripeness management system is configured to transmit to a user device at least one of the current ripeness levels, the predicted ripeness levels, and the ripening schedule adjustments.

In addition to one or more of the features described above, or as an alternative, further embodiments of the system may include that the storage device is configured to receive manual ripening schedule adjustments from a user device.

In addition to one or more of the features described above, or as an alternative, further embodiments of the system may include a user device activates an alarm when the predicted ripeness level is outside a selected ripeness range.

In addition to one or more of the features described above, or as an alternative, further embodiments of the system may include at least one sensor configured to monitor the perishable good parameters of the perishable goods and transmit the perishable good parameters to the storage device.

According to another embodiment, a method of managing ripeness of perishable goods is provided. The method including: storing, using a storage device, perishable good requirements, ripening capability parameters, ripening schedules, and perishable good parameters associated with the perishable goods; and analyzing, using a ripeness management system, the perishable good requirements, the ripening capability parameters, the ripening schedules, and the perishable good parameters. The ripeness management system coupled to the storage device. The ripeness management system including: a current ripeness determination module to determine current ripeness levels in response to at least one of the perishable good parameters, the perishable good requirements, and the ripening schedules; a ripeness schedule module to determine predicted ripeness levels in response to at least one of the current ripeness levels, the ripening capability parameters, and the ripening schedules; and a meshing module to determine ripening schedule adjustments in response to at least one of the current ripeness levels, the perishable good parameters, the ripening schedules, and the ripening capability parameters.

In addition to one or more of the features described above, or as an alternative, further embodiments of the method may include operating a transport refrigeration system in accordance with the ripening schedules, the transport refrigeration system being in operative communication with the storage device and the ripeness management system through a network.

In addition to one or more of the features described above, or as an alternative, further embodiments of the method may include adjusting the operation of the transport refrigeration system in response to at least one of the ripening schedule adjustments and manual ripening schedule adjustments.

In addition to one or more of the features described above, or as an alternative, further embodiments of the method may include transmitting, using the ripeness management system, to a user device at least one of the current ripeness levels, the predicted ripeness levels, and the ripening schedule adjustments.

In addition to one or more of the features described above, or as an alternative, further embodiments of the method may include receiving, using the storage device, manual ripening schedule adjustments from a user device.

In addition to one or more of the features described above, or as an alternative, further embodiments of the method may include activating, using a user device, an alarm when the predicted ripeness level is outside a selected ripeness range.

In addition to one or more of the features described above, or as an alternative, further embodiments of the method may include: monitoring, using at least one sensor, the perishable good parameters of the perishable goods; and transmitting the perishable good parameters to the storage device.

According to another embodiment, a computer program product tangibly embodied on a computer readable medium is provided. The computer program product including instructions that, when executed by a processor, cause the processor to perform operations. The operations include: storing, using a storage device, perishable good requirements, ripening capability parameters, ripening schedules, and perishable good parameters associated with the perishable goods; and analyzing, using a ripeness management system, the perishable good requirements, the ripening capability parameters, the ripening schedules, and the perishable good parameters. The ripeness management system coupled to the storage device. The ripeness management system including: a current ripeness determination module to determine current ripeness levels in response to at least one of the perishable good parameters, the perishable good requirements, and the ripening schedules; a ripeness schedule module to determine predicted ripeness levels in response to at least one of the current ripeness levels, the ripening capability parameters, and the ripening schedules; and a meshing module to determine ripening schedule adjustments in response to at least one of the current ripeness levels, the perishable good parameters, the ripening schedules, and the ripening capability parameters.

In addition to one or more of the features described above, or as an alternative, further embodiments of the computer program may include that the operations further include: operating a transport refrigeration system in accordance with the ripening schedules, the transport refrigeration system being in operative communication with the storage device and the ripeness management system through a network.

In addition to one or more of the features described above, or as an alternative, further embodiments of the computer program may include that the operations further include: adjusting the operation of the transport refrigeration system in response to at least one of the ripening schedule adjustments and manual ripening schedule adjustments.

In addition to one or more of the features described above, or as an alternative, further embodiments of the computer program may include that the operations further include: transmitting, using the ripeness management system, to a user device at least one of the current ripeness levels, the predicted ripeness levels, and the ripening schedule adjustments.

In addition to one or more of the features described above, or as an alternative, further embodiments of the computer program may include that the operations further include: receiving, using the storage device, manual ripening schedule adjustments from a user device.

In addition to one or more of the features described above, or as an alternative, further embodiments of the computer program may include that the operations further include: activating, using a user device, an alarm when the predicted ripeness level is outside a selected ripeness range.

In addition to one or more of the features described above, or as an alternative, further embodiments of the computer program may include that the operations further include: monitoring, using at least one sensor, the perishable good parameters of the perishable goods; and transmitting the perishable good parameters to the storage device.

Technical effects of embodiments of the present disclosure include tracking various parameters of perishable goods and adjusting the parameters to ensure the perishable goods reach peak ripeness at the time of delivery.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION OF THE DISCLOSURE

Figure 1:
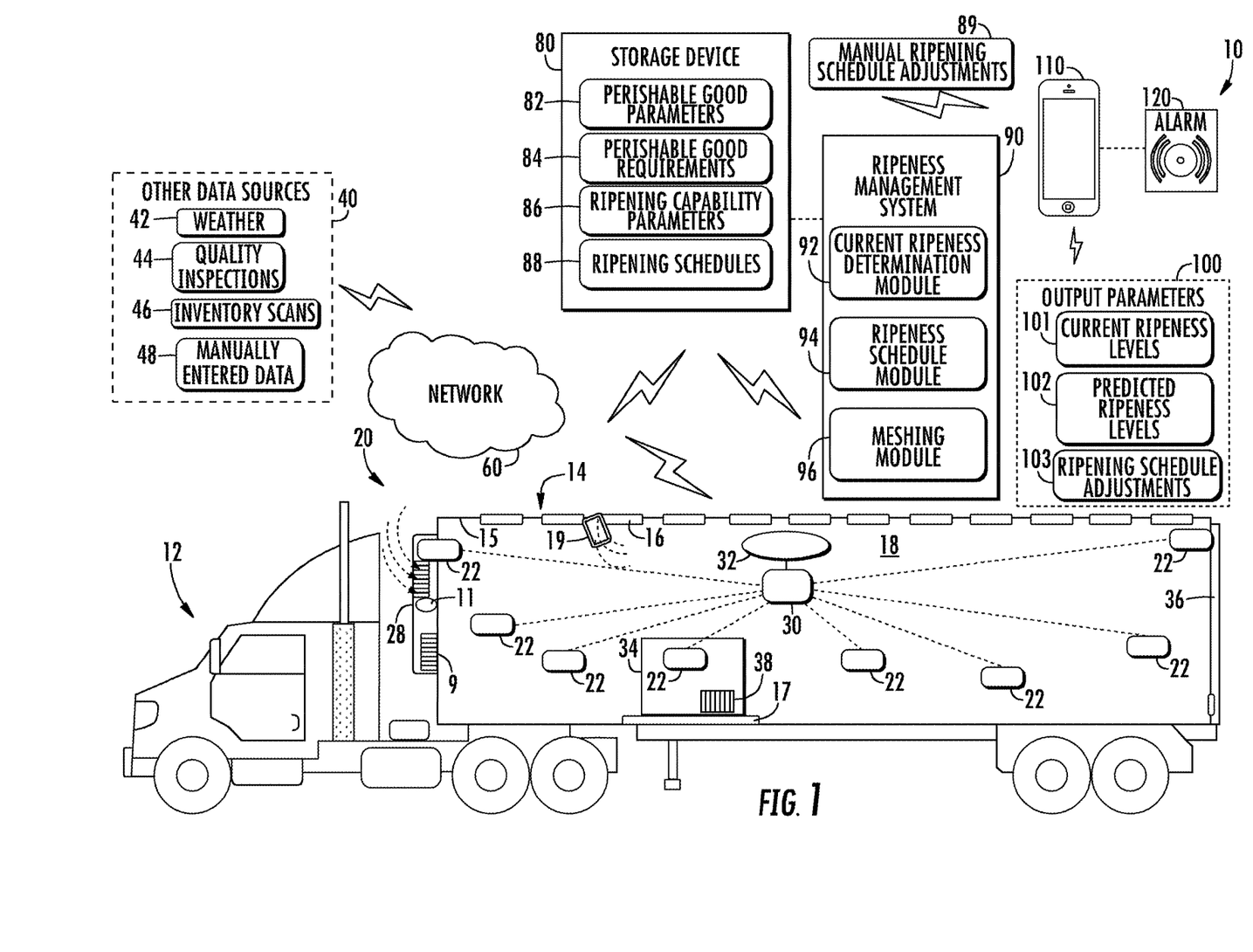
FIG. 1 illustrates a schematic view of a system for managing ripeness of perishable goods, according to an embodiment of the present disclosure.
Figure 2:
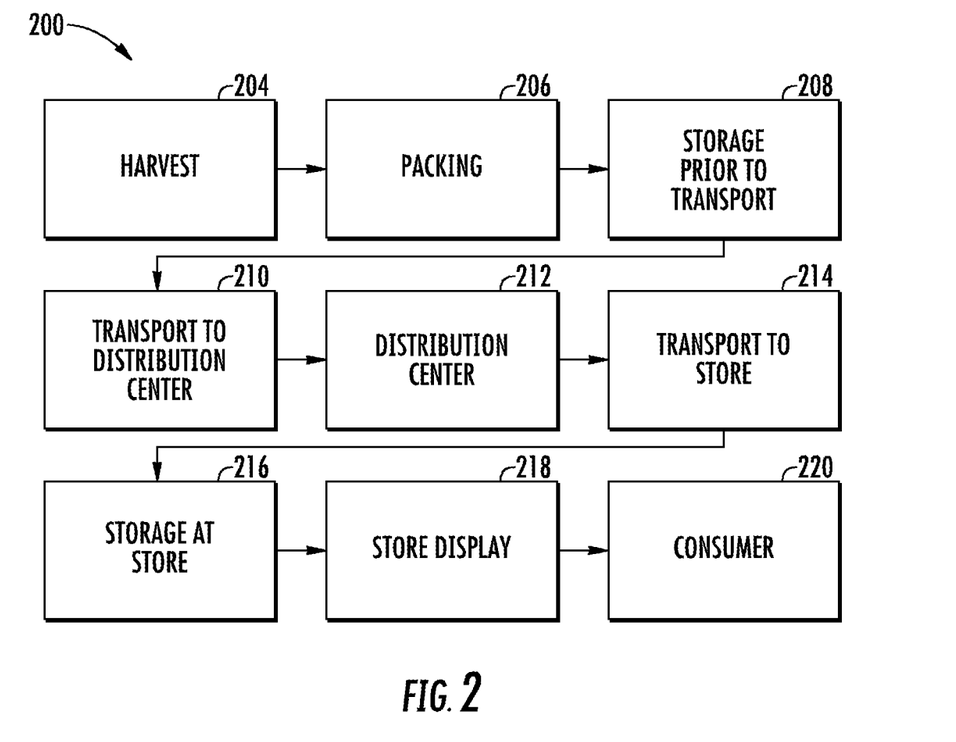
FIG. 2 illustrates a schematic view of a cold chain distribution system that may incorporate embodiments of the present disclosure.

Referring now to the drawings, FIG. 1 illustrates a schematic view of a system 10 for managing ripeness of perishable goods 34, according to an embodiment of the present disclosure. FIG. 2 illustrates a schematic view of a cold chain distribution system 200 that may incorporate embodiments of the present disclosure. Typically, transport refrigeration systems 20 are used to transport and distribute perishable goods and environmentally sensitive goods (herein referred to as perishable goods 34). In the illustrated embodiment, a transport refrigeration system 20 includes the environmentally controlled container 14, a transport refrigeration unit 28 and perishable goods 34. The container 14 may be pulled by a tractor 12. It is understood that embodiments described herein may be applied to shipping containers that are shipped by rail, sea, or any other suitable container, without use of a tractor 12. The container 14 may define an interior compartment 18.

In the illustrated embodiment, the transport refrigeration unit 28 is associated with a container 14 to provide desired environmental parameters, such as, for example, temperature, pressure, humidity, carbon dioxide, ethylene, ozone, light exposure, vibration exposure, and other conditions to the interior compartment 18. In an embodiment, the transport refrigeration unit 28 is a refrigeration system capable of providing a desired temperature and humidity range. The container 14 may be equipped with artificial lights or adjustable sky lights 16 in the roof of the transport container. The lights 16 may help regulate light exposure of the perishable goods 34. The transport refrigeration system 20 may also be equipped with shakers or stirrers 17 to help regulate vibrations of the perishable goods 34 or mix the perishable goods 34 in route. For example, some perishable goods may need to be shaken and/or stirred to mix a composition to ensure the composition is ripe at the time of delivery. The transport refrigeration system 20 may also be equipped with water sprayers 19 to control moisture content within the container 14. The transport refrigeration system 20 may include a ripening gas 11, which may be injected into the container to help ripening the perishable goods 34. The ripening gas 11 may be injected into the container 14 using the refrigeration unit 28. In an embodiment, the ripening gas 11 may be ethylene. Additionally, the transport refrigeration system 20 may be include an air scrubber 9 to remove unwanted particulates from the container 14, such as, for example, excess $CO_2$, ethylene, moisture, or any excess or unwanted particulate known to one of skill in the art. The scrubber 9 may be part of the refrigeration unit 28, as seen in FIG. 1. The perishable goods 34 may include but are not limited to fruits, vegetables, grains, beans, nuts, eggs, dairy, seed, flowers, meat, poultry, fish, ice, blood, pharmaceuticals, or any other suitable cargo requiring cold chain transport.

In the illustrated embodiment, the transport refrigeration system 20 includes sensors 22, which may be hard wired or wireless. The sensors 22 may be utilized to monitor perishable good parameters 82 of the perishable goods 34. The perishable good parameters 82 monitored by the sensors 22 may include but are not limited to temperature, pressure, humidity, carbon dioxide, ethylene, ozone, light exposure, vibrations, and other conditions in the interior compartment 18. Accordingly, suitable sensors 22 are utilized to monitor the desired perishable good parameters 82. Advantageously, sensors 22 may be selected for certain applications depending on the type of perishable goods 34 to be monitored and the corresponding environmental sensitivities. For instance, perishable goods 34 that are hyper sensitive to ethylene may require additional sensors 22 specifically for ethylene. In an embodiment, ripening gas levels are monitored. In an embodiment, ethylene levels are monitored. As seen in FIG. 1, the sensors 22 may be placed directly on the perishable goods 34.

Additionally, the sensors 22 may be placed in a variety of locations including but not limited to on the transport refrigeration unit 28, on a door 36 of the container 14 and throughout the interior compartment 18. The sensors 22 may be placed directly within the transport refrigeration unit 28 to monitor the performance of the transport refrigeration unit 28. As seen, the sensors 22 may also be placed on the door 36 of the container 14 to monitor the position of the door 36. Whether the door 36 is open or closed affects both the temperature of the container 14 and the perishable goods 34. For instance, in hot weather, an open door 36 will allow cooled air to escape from the container 14, causing the temperature of the interior compartment 18 to rise, thus affecting the temperature and the ripeness of the perishable goods 34. Additional heat may increase the ripening process for certain perishable goods 34. Additionally, a global positioning system (GPS) location may also be detected by the sensors 22. The GPS location may help in providing time-based location information for the perishable goods 34 that will help in tracking the travel route and other perishable good parameters 82 along that route. For instance, the GPS location may also help in providing information from other data sources 40 regarding weather 42 experienced by the container 14 along the travel route. The local weather 42 affects the temperature of the container 14 and thus may affect the temperature of the perishable goods 34. GPS may also help in determining how much time is left until the perishable goods 34 reach their final destination, which in turn will determine how much ripening is left.

As illustrated in FIG. 1, the transport refrigeration system 20 may further include, a controller 30 configured to log a plurality of readings from the sensors 22, known as the perishable good parameters 82, at a selected sampling rate. The controller 30 may be enclosed within the transport refrigeration unit 28 or separate from the transport refrigeration unit 28 as illustrated. The perishable good parameters 82 may further be augmented with time, location stamps or other relevant information. The controller 30 may also include a processor (not shown) and an associated memory (not shown). The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

In an illustrated embodiment, the transport refrigeration system 20 may include a communication module 32 in operative communication with the controller 30 and in operative communication with a network 60. The communication module 32 is configured to transmit the perishable good parameters 82 to the network 60. The controller may be in hardwired and/or wireless operative communication with the network 60. The wireless communication may be, but is not limited to, radio, microwave, cellular, satellite, or another wireless communication method. The network 60 may be but is not limited to satellite networks, cellular networks, cloud computing network, wide area network, or another type of wireless network. The communication module 32 may include a short range interface, such as, for example, a wired interface, an optical interface, and a short range wireless interface.

Perishable good parameters 82 may also be provided by other data sources 40, as illustrated in FIG. 1. These other data sources 40 may be collected at any point throughout the cold chain distribution system 200, which as illustrated in FIG. 2 may include harvest 204, packing 206, storage prior to transport 208, transport to distribution center 210, distribution center 212, transport to store 214, storage at store 216, store display 218 and consumer 220. The perishable goods 34 may be carried in the container during the transport to distribution center 210 and the transport to store 214. These stages are provided for illustrative purposes and a distribution chain may include fewer stages or additional stages, such as, for example, a cleaning stage, a processing stage, and additional transportation stages. The other data sources 40 may include, but are not limited to, weather 42, quality inspections 44, inventory scans 46, and manually entered data 48. The weather 42, as discussed above, has an effect on the operation of the transport refrigeration unit 28 by influencing the temperature of the container 14 during transport (e.g., 210 and 214) but the weather 42 also has other influences on the transport refrigeration unit 28. For instance, the weather 42 prior to and at harvest 204 may have an impact on the quality of the perishable goods 34. Moreover, quality inspections 44, similar to the weather 42, may reveal data of the perishable goods 34 that affects quality and potential ripeness. For instance, a particular batch of strawberries was subjected to rainfall just prior to harvest 204, making them prone to spoilage while in the container 14. Quality inspections 44 may be done by a machine or a human being. Quality inspections 44 performed by a machine may be accomplished using a variety of techniques including but not limited to optical, odor, soundwave, infrared, or physical probe.

Further, inventory scans 46 may also reveal perishable good parameters 82 about the perishable goods 34 and may help in tracking the perishable goods 34. For instance, the inventory scan 46 may reveal the time, day, truck the perishable goods arrived on, which may help identify the farm if previously unknown. Knowing the origin of the perishable goods 34 may help determine ripeness by knowing the conditions in which the perishable goods where produced. For instance, if one producer does not use preservatives, their perishable goods may ripen sooner. While the system 10 includes sensors 22 to aid in automation, often times the need for manual data entry is unavoidable. The manually entered data 48 may be input via a variety of devices including but not limited to a cellular phone, tablet, laptop, smartwatch, a desktop computer or any other similar data input device known to one of skill in the art.

Perishable good parameters 82 collected throughout each stage of the cold chain distribution system 200 may include environment conditions experienced by the perishable goods 34 such as, for example, temperature, pressure, humidity, carbon dioxide, ethylene, ozone, vibrations, light exposure, weather, time and location. For instance, strawberries may have experienced an excessive shock or were kept at 34° F. during transport. Perishable good parameters 82 may further include attributes of the perishable goods 34 such as, for example, temperature, weight, size, sugar content, maturity, grade, ripeness, labeling, packaging and the type of perishable good. For instance, strawberries may be packaged in 1 pound clamshells, be a certain weight or grade, be organic, and have certain packaging or labels on the clamshells. Packaging may aid or delay the ripening process. For instance, many bananas are shipped in plastic bags to speed up the ripening process by concentrating the levels of ethylene around the bananas as the bananas release ethylene.

Perishable good parameters 82 may include information regarding the type of perishable good, which may help prevent contamination issues between incompatible perishable goods 34. For example, one perishable good 34 may release excessive amounts of ethylene, while another may be ethylene sensitive. The type of perishable good 34 within the container may be identified by a manifest or contents list for the container 14 as manually entered data 48. The type of perishable good 34 within the container may also be identified by inventory scans 46, or scans of ID tags 38. The ID tag 38 may be a Universal Product Code (UPC) bar code, Quick Response (QR) code, Radio-frequency identification (RFID) or another identification methodology known to one of skill in the art. Perishable good parameters 82 may also include information regarding the operation of the environmental control unit 28, as discussed above. The perishable good parameters 82 may further be augmented with time, location stamps or other relevant information.

In the illustrated embodiment, the system 10 further includes a storage device 80 to store the perishable good parameters 82 associated with the perishable goods 34. At least one of the perishable good parameters 82 may be received from a transport refrigeration system 20. The storage device 80 is connected to the communication module 32 through the network 60. The storage device 80 may be but is not limited to a random access memory (RAM), read only memory (ROM), or other electronic, optical, magnetic or any other computer readable medium. The storage device may also store perishable good requirements 84, ripening capability parameters 86, ripening schedules 88 and manual ripening schedule adjustments 89, as discussed below.

In the illustrated embodiment, the system 10 further includes a ripeness management system 90. The ripeness management system 90 is connected to the communication module 32 through the network 60. The ripeness management system 90 is also coupled to the storage device 80. As shown, the ripeness management system 90 includes a current ripeness determination module 92, a ripeness schedule module 94, and a meshing module 96. The ripeness management system 90 may also include a processor (not shown) and an associated memory (not shown). The associated memory may be the storage device 80. The processor may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium. The current ripeness determination module 92, the ripeness schedule module 94, and the meshing module 96 may be implemented in software as applications executed by the processor of ripeness management system 90.

The current ripeness determination module 92 determines current ripeness levels 101 in response to at least one of the perishable good parameters 82, the perishable good requirements 84, and the ripening schedules 88. The ripeness schedule module 94 determines predicted ripeness levels 102 in response to at least one of the current ripeness levels 101, ripening capability parameters 86, and ripening schedules 88. The perishable good requirements 84 may be requirements for handling and/or packaging the perishable good 34 such as, for example, government regulations or industry standards. Ripening capability parameters 86 are parameters regarding the ripening capabilities of the specific container 14, such as, for example, transport refrigeration unit 28, ripening gases 11, lights 16 to control light exposure, scrubbers 9 to remove gases, shakers or stirrers 17 to mix mixtures in route to the destination. The ripening capability parameters 86 may also include information regarding size of the container 14, shape of the container 14, material of the container 14, and other various component details within the refrigeration system 20. For instance, the container 14 may require additional ethylene injected due its large size. Ripening schedules 88 may include algorithms and curves of historical ripening schedules of perishable goods 34 to aid the current ripeness determination module 92 in determining the current ripeness levels 101 of the perishable goods and also to aid the ripeness schedule module 94 in determining the predicted ripeness levels 102. The ripening schedules 88 may also include the planned ripening schedules for the perishable goods 34 currently in the container 14, which control the operation of the transport refrigeration system 20.

The meshing module 96 determines ripening schedule adjustments 103 in response to at least one of the predicted ripeness levels 102, the perishable good parameters 82, ripening capability parameters 86, and ripening schedules 88. For example, the predicted ripeness level 102 may show that the perishable good 34 will be past peak ripeness at the time of delivery, thus the meshing module 96 will use this information to determine ripening schedule adjustments 103, which may slow the release of the ripening gas 11 into the container 14. The current ripeness levels 101, the predicted ripeness levels 102, and the ripening schedule adjustments 103 may be accessible via a user device 110 and/or sent directly to the user device 110. The user device 110 may be a device such as, for example, a cellular phone, tablet, laptop, smartwatch, a desktop computer or any other similar data input device known to one of skill in the art. The ripeness management system 90 may be configured to transmit at least one of the current ripeness levels 101, the predicted ripeness levels 102, and the ripening schedule adjustments 103 to the user device 110. The user device 110 may activate an alarm 120 when the predicted ripeness level is outside a selected ripeness range. The alarm 120 may be audible and/or visual. The alarm 120 may indicate that ripening schedule adjustments 103 are required and provide a description of the ripening schedule adjustments 103. The user device 110 may activate the alarm 120 when the ripening schedule adjustments 103 are received. An individual may send manual ripening schedule adjustments 89 to the storage device 80 using the user device 110. For example, if a user disagrees with the determined ripening schedule adjustment 103, they may wish to override it. Further, the manual ripening schedule adjustments 89 also allow a user to individually adjust the ripening capability parameters 86. In one example, a manual ripening schedule adjustment 89 may command the ripening gas 11 to be released for a specific period of time. In a second example, a manual ripening schedule adjustment 89 may command the shakers or stirrers 17 to be activated. In a third example, a manual ripening schedule adjustment 89 may turn on the lights 16 to expose the perishable goods 34 to more light instantly. Thus, the manual ripening schedule adjustments 89 give the user the option to instantaneously adjust the ripening capability parameters 86 or schedule the adjustment of the ripening capability parameters 86. Both the ripening schedule adjustments 103 and the manual ripening schedule adjustments 89 may be transmitted back to the storage device 80 to update the ripening schedules 88 for the perishable goods in the container 14. The storage device 80 is configured to receive the ripening schedule adjustments 103, 89 and transmit the ripening schedules 89 to the controller to adjust the operation of the transport refrigeration system 20.

Figure 3:
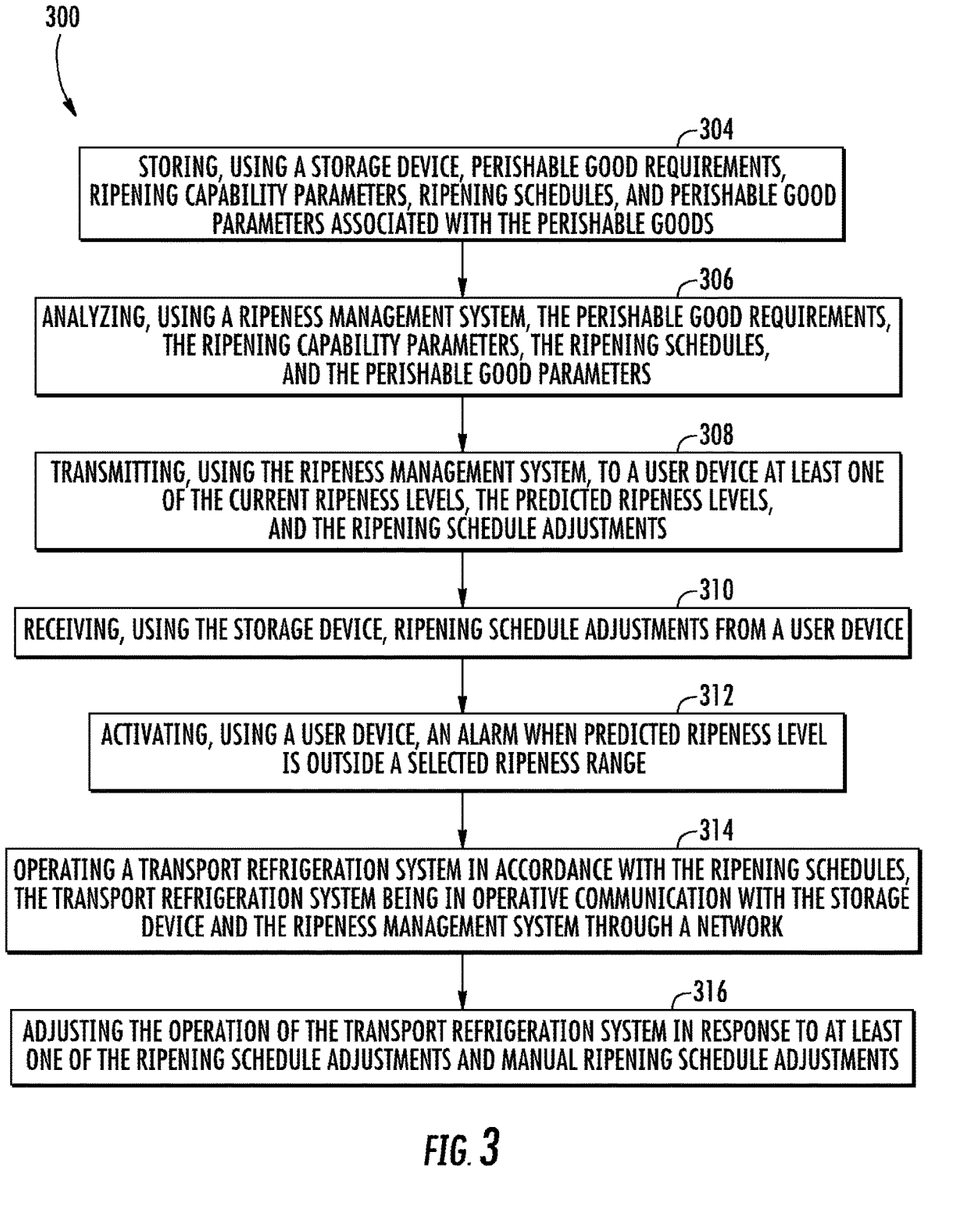
FIG. 3 is a flow diagram illustrating a method of managing ripeness of perishable goods, according to an embodiment of the present disclosure.

Referring now also to FIG. 3, which shows a flow diagram illustrating a method 300 of managing ripeness of perishable goods 34, according to an embodiment of the present disclosure. At block 304, the storage device 80 stores perishable good requirements 84, ripening capability parameters 86, ripening schedules 88, and perishable good parameters 82 associated with the perishable goods 34. At block 306, the ripeness management system 90 analyzes the perishable good requirements 84, the ripening capability parameters 86, the ripening schedules 88, and the perishable good parameters 82. The ripeness management system 90 is coupled to the storage device 80. As described above, the ripeness management system 90 includes: the current ripeness determination module 92 to determine current ripeness levels 101 in response to at least one of the perishable good parameters 82, the perishable good requirements 84, and the ripening schedules 88; a ripeness schedule module 94 to determine predicted ripeness levels 102 in response to at least one of the current ripeness levels 102, the ripening capability parameters 86, and the ripening schedules 88; and a meshing module 96 to determine schedule adjustments 103 in response to at least one of the current ripeness levels 101, the perishable good parameters 82, the ripening schedules 88, and the ripening capability parameters 86.

Further, at block 308, the meshing module 96 may transmit to the user device 110 at least one of the current ripeness levels 101, the predicted ripeness levels 102, and the ripening schedule adjustments 103. At block 310, the storage device 80 may receive manual ripening schedule adjustments 89 from the user device 110. At block 312, the user device 110 may activate the alarm 120 when the predicted ripeness level 102 is outside a selected ripeness range. At block 314, the transport refrigeration system 20 may be operated in accordance with the ripening schedules 88. The transport refrigeration system 20 being in operative communication with the storage device 80 and the ripeness management system 90 through the network 60. At block 316, the operation of the transport refrigeration system 20 may be adjusted in response to at least one of the ripening schedule adjustments 103 and manual ripening schedule adjustments 89. The method 300 may also include monitoring, using at least one sensor 22, the perishable good parameters 82 of the perishable goods 34; and transmitting the perishable good parameters 82 to the storage device 80.

While the above description has described the flow process of FIG. 3 in a particular order, it should be appreciated that unless otherwise specifically required in the attached claims that the ordering of the steps may be varied.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A system for managing ripeness of perishable goods, the system comprising:
   a transport refrigeration system configured to operate in accordance with ripening schedules;

a storage device in operative communication with the transport refrigeration system through a network and configured to store perishable good requirements, ripening capability parameters, the ripening schedules, and perishable good parameters associated with the perishable goods; and a ripeness management system coupled to the storage device and in operative communication with the transport refrigeration system through the network, the ripeness management system including:

a current ripeness determination module to determine current ripeness levels in response to the perishable good parameters, the perishable good requirements, and the ripening schedules;

a ripeness schedule module to determine predicted ripeness levels in response to the current ripeness levels, the ripening capability parameters, and the ripening schedules; and a meshing module to determine ripening schedule adjustments in response to the current ripeness levels, the perishable good parameters, the ripening schedules, and the ripening capability parameters;

wherein the transport refrigeration system comprises a refrigeration unit and at least one of an artificial light, an adjustable sky light, a shaker, a stirrer, and a water sprayer; and wherein the transport refrigeration system is configured to adjust operation of at least one of the artificial light, the adjustable skylight, the shaker, the stirrer, and the water sprayer in response to the ripening schedule adjustments.

2. The system of claim 1, wherein:
the operation of the transport refrigeration system is adjusted in response to manual ripening schedule adjustments.

3. The system of claim 1, wherein:
the ripeness management system is configured to transmit to a user device at least one of the current ripeness levels, the predicted ripeness levels, and the ripening schedule adjustments.

4. The system of claim 1, wherein:
the storage device is configured to receive manual ripening schedule adjustments from a user device.

5. The system of claim 1, further comprising:
a user device activates an alarm when the predicted ripeness level is outside a selected ripeness range.

6. The system of claim 1, further comprising:
at least one sensor configured to monitor the perishable good parameters of the perishable goods and transmit the perishable good parameters to the storage device.

7. A method of managing ripeness of perishable goods, the method comprising:
operating a transport refrigeration system in accordance with ripening schedules,
the transport refrigeration system being in operative communication with a storage device and a ripeness management system through a network,
wherein the transport refrigeration system comprises a refrigeration unit and at least one of an artificial light, an adjustable skylight, a shaker, a stirrer and a water sprayer;
storing, using the storage device, perishable good requirements, ripening capability parameters, ripening schedules, and perishable good parameters associated with the perishable goods;
analyzing, using the ripeness management system, the perishable good requirements, the ripening capability parameters, the ripening schedules, and the perishable good parameters, the ripeness management system coupled to the storage device, the ripeness management system including:

a current ripeness determination module to determine current ripeness levels in response to the perishable good parameters, the perishable good requirements, and the ripening schedules;

a ripeness schedule module to determine predicted ripeness levels in response to the current ripeness levels, the ripening capability parameters, and the ripening schedules; and a meshing module to determine ripening schedule adjustments in response to the current ripeness levels, the perishable good parameters, the ripening schedules, and the ripening capability parameters; and adjusting operation of at least one of the artificial light, the adjustable skylight, the shaker, the stirrer and the water sprayer in response to the ripening schedule adjustments.

8. The method of claim 7, further comprising:
adjusting the operation of the transport refrigeration system in response to manual ripening schedule adjustments.

9. The method of claim 7, further comprising:
transmitting, using the ripeness management system, to a user device at least one of the current ripeness levels, the predicted ripeness levels, and the ripening schedule adjustments.

10. The method of claim 7, further comprising:
receiving, using the storage device, manual ripening schedule adjustments from a user device.

11. The method of claim 7, further comprising:
activating, using a user device, an alarm when the predicted ripeness level is outside a selected ripeness range.

12. A computer program product tangibly embodied on a computer readable medium, the computer program product including instructions that, when executed by a processor, cause the processor to perform operations comprising:
operating a transport refrigeration system in accordance with ripening schedules,
the transport refrigeration system being in operative communication with a storage device and a ripeness management system through a network,
wherein the transport refrigeration system comprises a refrigeration unit and at least one of an artificial light, an adjustable skylight, a shaker, a stirrer and a water sprayer;
storing, using the storage device, perishable good requirements, ripening capability parameters, ripening schedules, and perishable good parameters associated with the perishable goods; and
analyzing, using the ripeness management system, the perishable good requirements, the ripening capability parameters, the ripening schedules, and the perishable good parameters, the ripeness management system coupled to the storage device, the ripeness management system including:

a current ripeness determination module to determine current ripeness levels in response to the perishable good parameters, the perishable good requirements, and the ripening schedules;

a ripeness schedule module to determine predicted ripeness levels in response to the current ripeness levels, the ripening capability parameters, and the ripening schedules; and a meshing module to determine ripening schedule adjustments in response to the current ripeness levels, the perishable good parameters, the ripening schedules, and the ripening capability parameters; and adjusting operation of at least one of the artificial light, the adjustable skylight, the shaker, the stirrer and the water sprayer in response to the ripening schedule adjustments.

13. The system of claim 1, wherein the transport refrigeration system comprises the artificial light, and wherein the transport refrigeration system is configured to adjust operation of the artificial light in response to the ripening schedule adjustments.

14. The system of claim 1, wherein the transport refrigeration system comprises the adjustable sky light, and wherein the transport refrigeration system is configured to adjust operation of the adjustable skylight in response to the ripening schedule adjustments.

15. The system of claim 1, wherein the transport refrigeration system comprises the shaker, and wherein the transport refrigeration system is configured to adjust operation of the shaker in response to the ripening schedule adjustments.

16. The system of claim 1, wherein the transport refrigeration system comprises the stirrer, and wherein the transport refrigeration system is configured to adjust operation of the stirrer in response to the ripening schedule adjustments.

17. The system of claim 1, wherein the transport refrigeration system comprises the water sprayer, and wherein the transport refrigeration system is configured to adjust operation of the water sprayer in response to the ripening schedule adjustments.

\* \* \* \* \*